(12) United States Patent
Walker

(10) Patent No.: US 12,611,586 B2
(45) Date of Patent: Apr. 28, 2026

(54) SYSTEM AND METHOD FOR GENERATING DAILY-UPDATED RATING OF INDIVIDUAL PLAYER PERFORMANCE IN SPORTS

(71) Applicant: STATS LLC, Chicago, IL (US)

(72) Inventor: Nathan Walker, Durham, NC (US)

(73) Assignee: STATS LLC, Chicago, IL (US)

( * ) Notice: Subject to any disclaimer, the term of this patent is extended or adjusted under 35 U.S.C. 154(b) by 164 days.

(21) Appl. No.: 17/807,582

(22) Filed: Jun. 17, 2022

(65) Prior Publication Data

US 2023/0116986 A1 Apr. 20, 2023

Related U.S. Application Data

(60) Provisional application No. 63/262,665, filed on Oct. 18, 2021.

(51) Int. Cl.
| | |
|---|---|
| *A63B 71/06* | (2006.01) |
| *A63B 24/00* | (2006.01) |
| *G06F 18/2415* | (2023.01) |

(52) U.S. Cl.
CPC ...... *A63B 71/0669* (2013.01); *A63B 24/0062* (2013.01); *G06F 18/24155* (2023.01)

(58) Field of Classification Search
CPC ............ A63B 71/0669; A63B 24/0062; G06F 18/24155
See application file for complete search history.

(56) References Cited

U.S. PATENT DOCUMENTS

| | | | | |
|---|---|---|---|---|
| 8,622,797 | B2 * | 1/2014 | Noonan ................. | A63F 13/58 |
| | | | | 463/9 |
| 2007/0279494 | A1 * | 12/2007 | Aman .................... | H04N 5/262 |
| | | | | 348/169 |
| 2011/0237317 | A1 * | 9/2011 | Noonan ................ | A63F 13/828 |
| | | | | 463/2 |
| 2012/0283858 | A1 * | 11/2012 | Lapadula ............. | A63F 13/828 |
| | | | | 700/93 |

(Continued)

OTHER PUBLICATIONS

Medvedovsky, et al., "Daily Adjusted and Regressed Kalman Optimized projections," DARKO Exploration, https://apanalytics.shinyapps.io/DARKO/, printed on Jun. 17, 2022, 8 pages.

(Continued)

*Primary Examiner* — Dmitry Suhol
*Assistant Examiner* — Ankit B Doshi
(74) *Attorney, Agent, or Firm* — Bookoff McAndrews, PLLC

(57) ABSTRACT
A computing system identifies a target player. The computing system generates rookie priors for the target player based on characteristics of the target player. The computing system generates time series data points for the player based on at least one of the rookie priors and historical statistics of the target player. The computing system projects a game position of the target player based on the historical statistics of the target player. The computing system projects next game projections for the target player based on at least one of the rookie priors, the time series data points, the game position, and the historical statistics of the target player. The computing system generates a contribution of the target player to a team's production based on the next game projections.

20 Claims, 5 Drawing Sheets

(56) References Cited

U.S. PATENT DOCUMENTS

| | | | |
|---|---|---|---|
| 2013/0282640 A1* | 10/2013 | LaPadula, III | G06Q 10/0637 |
| | | | 706/46 |
| 2014/0155178 A1 | 6/2014 | Bloodworth | |
| 2015/0258443 A1 | 9/2015 | McAuley et al. | |
| 2015/0297949 A1* | 10/2015 | Aman | G06T 7/246 |
| | | | 348/157 |
| 2016/0296843 A1* | 10/2016 | Stickel | A63F 13/46 |
| 2019/0224556 A1 | 7/2019 | Ruiz et al. | |
| 2022/0080263 A1* | 3/2022 | Brush | G16H 40/67 |
| 2023/0116986 A1* | 4/2023 | Walker | G06Q 10/0639 |
| | | | 700/91 |

OTHER PUBLICATIONS

Goldstein, "Nylon Calculus: Introducing Player Impact Plus-Minus," Fansided.com, https://fansided.com/2018/01/11/nylon-calculus-introducing-player-impact-plus-minus/, Jan. 11, 2018, 10 pages.

Bball Index, "Lebron Database," The Alchemists, https://www.bball-index.com/lebron-database/, printed Jun. 17, 2022, 4 pages.

Dunks&Threes, "2022 NBA Player Stats," Snarr Data Science LLC, https://dunksandthrees.com/epm, 2019, 2 pages.

FiveThirtyEight, "The Best NBA Players, Accoridng to RAPTOR," ABC News Internet Ventures, https://projects.fivethirtyeight.com/nba-player-ratings/, Jun. 17, 2022, 10 pages.

Basketball Reference, "2020-21 NBA Player Stats: Advanced," The Sports Reference, https://www.basketball-reference.com/leagues/NBA_2021_advanced.html, printed Jun. 17, 2022, 28 pages.

ESPN, "NBA Real Plus-Minus—2021-22," ESPN.com, http://www.espn.com/nba/statistics/rpm, Apr. 10, 2022, 7 pages.

PCT International Application No. PCT/US22/77963, International Search Report and Written Opinion of the International Searching Authority, dated Jan. 3, 2023, 8 pages.

Miller, A. et al., "Factorized Point Process Intensities: A Spatial Analysis of Professional Basketball", arxiv.org, Cornell University Library, 201 Olin Library Cornell University Ithaca, NY 14853, Jan. 5, 2014, total 13 pages, XP080000470.

Yue, Y. et al.: "Learning Fine-Grained Spatial Models for Dynamic Sports Play Prediction", 2014 IEEE International Conference on Data Mining, Dec. 1, 2014, pp. 670-679, XP055639137.

* cited by examiner

200

SYSTEM AND METHOD FOR GENERATING DAILY-UPDATED RATING OF INDIVIDUAL PLAYER PERFORMANCE IN SPORTS

CROSS-REFERENCE TO RELATED APPLICATIONS

This application claims priority to U.S. Application Ser. No. 63/262,665, filed Oct. 18, 2021, which is hereby incorporated by reference in its entirety.

FIELD OF THE DISCLOSURE

The present disclosure generally relates to a system and method of generating daily-updated rating of individual player performance in sports.

BACKGROUND

As the amount of data related to sports increases, teams, fans, and companies alike strive to find a metric that adequately captures the impact of a player for their given team. While for some users, such as teams, coaches, and trainers, such metrics are critical to their team's performance, other user's such as fans may utilize the information to engage in what-if discussions or debates regarding who is the best player of their generation or who is the best player in a certain category of statistics.

SUMMARY

In some embodiments, a method is disclosed herein. A computing system identifies a target player. The computing system generates rookie priors for the target player based on characteristics of the target player. The computing system generates time series data points for the player based on at least one of the rookie priors and historical statistics of the target player. The computing system projects a game position of the target player based on the historical statistics of the target player. The computing system projects next game projections for the target player based on at least one of the rookie priors, the time series data points, the game position, and the historical statistics of the target player. The computing system generates a contribution of the target player to a team's production based on the next game projections.

In some embodiments, a non-transitory computer readable medium is disclosed herein. The non-transitory computer readable medium includes one or more sequences of instructions, which, when executed by one or more processors, causes a computing system to perform operations. The operations include identifying, by the computing system, a target player. The operations further include generating, by the computing system, rookie priors for the target player based on characteristics of the target player. The operations further include generating, by the computing system, time series data points for the target player based on at least one of the rookie priors and historical statistics of the target player. The operations further include projecting, by the computing system, a game position of the target player based on the historical statistics of the target player. The operations further include projecting, by the computing system, next game projections for the target player based on at least one of the rookie priors, the time series data points, the game position, and the historical statistics of the target player. The operations further include generating, by the computing system, a contribution of the target player to a team's production based on the next game projections.

In some embodiments, a system is disclosed herein. The system includes a processor and a memory. The memory has programming instructions stored thereon, which, when executed by the processor, causes the system to perform operations. The operations include identifying, by the computing system, a target player. The operations further include generating, by the computing system, rookie priors for the target player based on characteristics of the target player. The operations further include generating, by the computing system, time series data points for the target player based on at least one of the rookie priors and historical statistics of the target player. The operations further include projecting, by the computing system, a game position of the target player based on the historical statistics of the target player. The operations further include projecting, by the computing system, next game projections for the target player based on at least one of the rookie priors, the time series data points, the game position, and the historical statistics of the target player. The operations further include generating, by the computing system, a contribution of the target player to a team's production based on the next game projections.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Since the early years of basketball analytics, many individuals have attempted to condense player statistics into easy-to-digest metrics, including a "all-in-one" rating. Metrics, such as regularized adjusted plus/minus (RAPM), box plus/minus (BPM), and real plus/minus (RPM), have all been used to describe player overall performance and to predict future performance.

In the last few years, such metrics have grown quickly in number as scope. For example, these metrics have grown to include additional metrics such as, but not limited to, luck-adjusted player estimate using a box prior regularized on-off (LEBRON), estimated plus/minus (EPM), robust algorithm using player tracking and on-off ratings (RAPTOR). While all-in-one ratings can oversimplify a player's attributes, they are extremely powerful for team projections, injury adjustment, and generally having a good baseline for overall player value.

To improve upon conventional metrics, one or more technique described herein provide an improved all-in-one metric—daily-updated rating of individual performance (DRIP). To generate a DRIP value, the present approach utilizes box score data, play-by-play data, and lineup data to predict each player's contribution to their team's offensive and defensive ratings. However, rather than calculating these input statistics over a single season or career, the present approach "nowcasts" a player's current "true talent" estimate for each statistic. Such approach allows the system to answer dynamic questions, such as "What is Giannis' current two-point percentage?" and "How real is Michael Porter Jr.'s scoring jump?"

Figure 1:
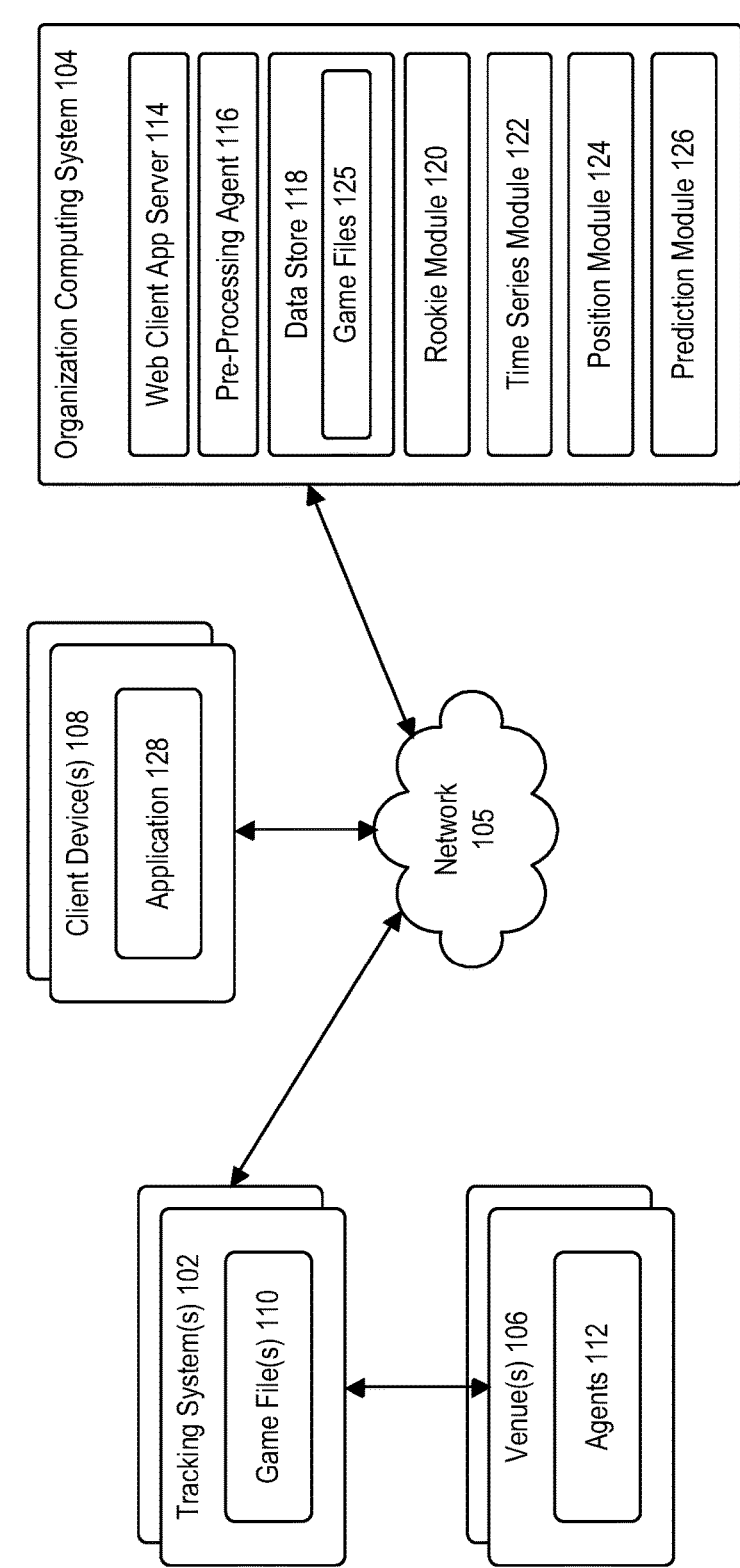
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to capture the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, etc.).

In some embodiments, tracking system 102 may be used for a broadcast feed of a given match. In such embodiments, each frame of the broadcast feed may be stored in a game file 110.

In some embodiments, game file 110 may further be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. For example, tracking system 102 may be configured to provide organization computing system 104 with a broadcast stream of a game or event in real-time or near real-time via network 105.

Organization computing system 104 may be configured to process the broadcast stream of the game and generate a DRIP value for one or more players. Organization computing system 104 may include at least a web client application server 114, a pre-processing agent 116, data store 118, a rookie module 120, a time series module 122, position module 124, and prediction module 126. Each of pre-processing agent 116, rookie module 120, time series module 122, position module 124, and prediction module 126 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 125. Each game file 125 may include video data of a given match. For example, the video data may correspond to a plurality of video frames captured by tracking system 102. In some embodiments, the video data may correspond to broadcast data of a given match, in which case, the video data may correspond to a plurality of video frames of the broadcast feed of a given match.

Pre-processing agent 116 may be configured to process data retrieved from data store 118. For example, pre-processing agent 116 may be configured to generate game files 125 stored in data store 118. For example, pre-processing agent 116 may be configured to generate a game file 125 based on data captured by tracking system 102. In some embodiments, pre-processing agent 116 may further be configured to store tracking data associated with each game in a respective game file 125. Tracking data may refer to the (x, y) coordinates of all players and balls on the playing surface during the game. In some embodiments, pre-processing agent 116 may receive tracking data directly from tracking system 102. In some embodiments, pre-processing agent 116 may derive tracking data from the broadcast feed of the game.

In some embodiments, pre-processing agent 116 may be configured to receive play-by-play data from one or more third party systems. For example, pre-processing agent 116 may receive a play-by-play feed corresponding to the broadcast video data. In some embodiments, the play-by-play data may be representative of human generated data based on events occurring within the game. Such play-by-play data may be stored in a corresponding game file 125.

In some embodiments, rookie module 120 may be configured to perform various operations for players that are rookies. A rookie may refer to a first-year player in the NBA. For rookies, there typically is not enough league-level data (e.g., NBA data) for a model to accurately project the player's performance. To account for this, rookie module 120 may utilize attributes, such as, but not limited to, height, weight, age, and draft pick number to predict or project the first game of a player's career. To do this, rookie module 120 may include a prediction model generated using previous rookie data in data store 118. Using this data, rookie module 120 may generate an adjusted game one estimate for each statistical category. Because such data is typically needed for the rookie's initial game, careful work was done to ensure that such projections are not used to develop the models for the rest of the player's career.

Time series module 122 may be configured to create time series data points for each player. For example, time series module 122 may generate time series data points for each player using one or more of a padding technique or bayes filters to achieve a baseline "now-cast" for each statistic a player accumulates. In some embodiments, a padding technique may refer to a padding of player performance with league average data. Rather than using a single game, season, or career-worth of free-throw percentage, time series module 122 may use all available data on a player, starting with the rookie priors generated by rookie module 120.

Position module 124 may be configured to model player position data. Generally, player position information is a useful tool in contextualizing plus/minus data. As those skilled in the art understand, the NBA has increasingly moved to a position-less game. Accordingly, rather than simply classify each player as a point guard, shooting guard, etc., position module 124 may be configured to estimate each player's current projected "game position" based on one or more statistical markers. Exemplary statistical markers may include, but are not limited to, passing and rebounding. In some embodiments, to account for the position-less aspect of the current game, the range for positional size may be in a range of 0-100, where 0 may represent the most "true point guard-like" and 100 is the most "true center-like."

Prediction module 126 may be configured to generate next game predictions for each player. For example, prediction module 126 may be configured to receive the foregoing features (e.g., rookie priors, time series data points, player position data, box score data, play-by-play data, and the like) as inputs and run the inputs through gradient-boosted decision trees to generate next-game projections for each player. Using the next-game predictions, prediction module 126 may take each statistical output and project player contribution to a team's plus/minus per 100 possessions on both offense and defense. In some embodiments, adjusted plus/minus may be used as the target. The final output may be representative of a player's DRIP value. In some embodiments, prediction module 126 may generate three output values: a DRIP value for offense, a DRIP value for defense, and a total DRIP value.

In some embodiments, prediction module 126 may include a separate prediction model tuned for each player. Given that all players are very different from each other, there are times that a prediction model may have trouble projecting their abilities. In such scenarios, projections from prediction module 126 may be compared with real-world or actual statistics. Using Steph Curry, for example, if prediction module 126 generates a three-point percentage for Curry that is below Curry's average three-point percentage, an operator may adjust the weights of Curry's individualized prediction model.

Client device 108 may be in communication with organization computing system 104 via network 105. Client device 108 may be operated by a user. For example, client device 108 may be a mobile device, a tablet, a desktop computer, a set-top box, a streaming player, or any computing system capable of receiving, rendering, and presenting video data to the user. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 128. Application 128 may be representative of a web browser that allows access to a website or a stand-alone application. Client device 108 may access application 128 to access one or more functionalities of organization computing system 104. Client device 108 may communicate over network 105 to request a webpage, for example, from web client application server 114 of organization computing system 104. For example, client device 108 may be configured to execute application 128 to access one or more DRIP values generated by prediction module 126. The content that is displayed to client device 108 may be transmitted from web client application server 114 to client device 108, and subsequently processed by application 128 for display through a graphical user interface (GUI) of client device 108.

Figure 2:
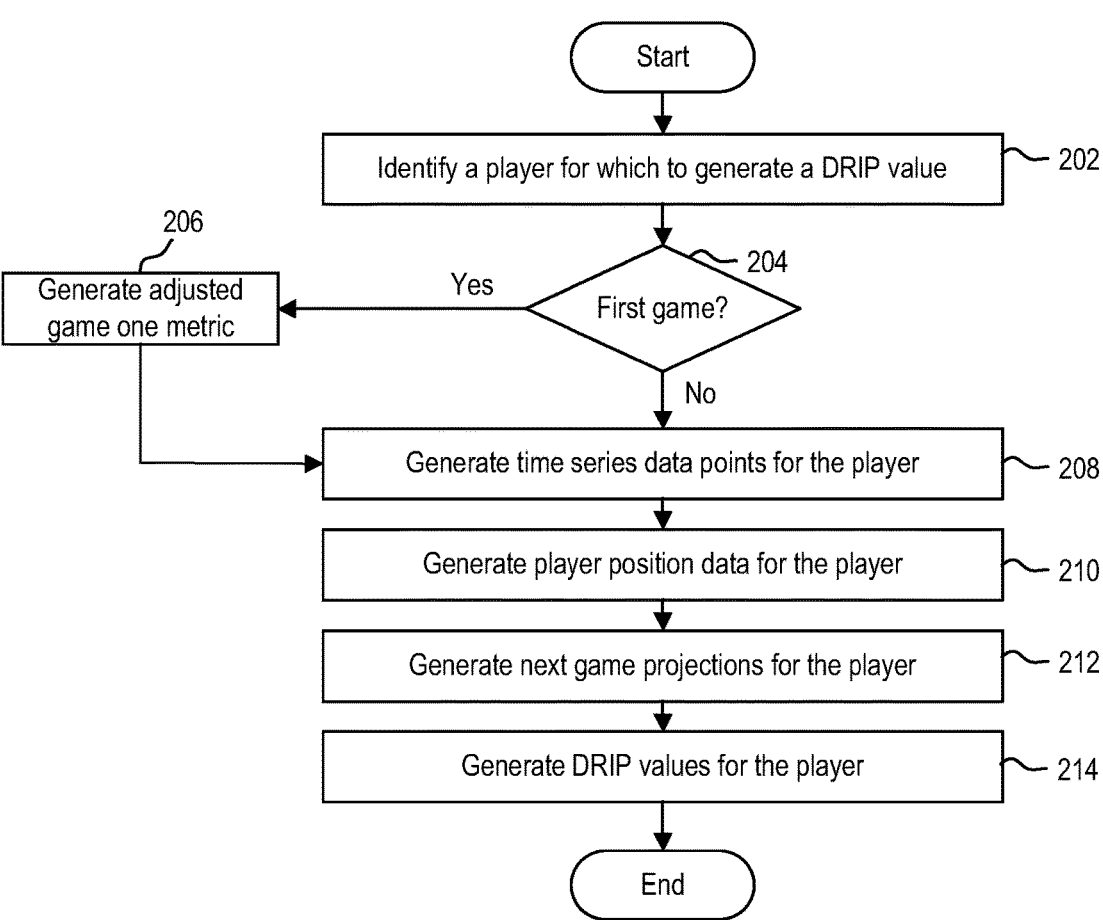
FIG. 2 is a flow diagram illustrating a method of generating DRIP values for a player, according to example embodiments.

FIG. 2 is a flow diagram illustrating a method 200 of generating DRIP values for a player, according to example embodiments. Method 200 may begin at step 202.

At step 202, organization computing system 104 may identify a player for which to generate a DRIP value. In some embodiments, organization computing system 104 may identify a player for which to generate a DRIP value, responsive to receiving a request from a user of client device 108. In some embodiments, organization computing system 104 may identify a player for which to generate a DRIP value automatically, such as at a preset time during the day, in which organization computing system 104 generates DRIP values for each player in the league.

At step 204, organization computing system 104 may determine whether the player has played a game in the league (e.g., the NBA). For example, rookie module 120 may determine whether any box-score or play-by-play data is associated with the player in data store 118. If, at step 204, rookie module 120 determines that the player has not yet played a game in the league, then method 200 proceeds to step 206.

At step 206, organization computing system 104 may generate an adjusted game one metric for the player. For example, rookie module 120 may utilize attributes, such as but not limited to height, weight, age, and/or draft pick number, to predict metrics corresponding to a first game of the player's career. To generate the adjusted game one metric, rookie module 120 may utilize a rookie model, generated using previous rookie data from data store 118. Using the rookie model, rookie module 120 may generate an adjusted game one estimate for each statistical category.

If, however, at step 204, rookie module 120 determines that the player has played a game in the league, then method 200 proceeds to step 208.

At step 208, organization computing system 104 may generate time series data points for the player. For example, time series module 122 may generate time series data points for the player using one or more of a padding technique or bayes filters to achieve a baseline "now-cast" for each statistic a player accumulates. To generate the time series data points for the player, time series module 122 may use all available data on the player, starting with the rookie priors generated by rookie module 120.

At step 210, organization computing system 104 may generate player position data for the player. For example, position module 124 may estimate the player's current projected "game position" based on one or more statistical markers. Exemplary statistical markers may include, but are not limited to, passing and rebounding. In some embodiments, as output, position module 124 may generate a value representing the player's position. For example, position module 124 may generate a value within the range of 0-100, where 0 may represent the most "true point guard-like" and 100 is the most "true center-like."

At step 212, organization computing system 104 may generate next game projections for the player. For example, prediction module 126 may receive rookie priors for the player, the time series data points for the players, the player position data, the player box score data, the player play-by-play data, and the like as inputs. Prediction module 126 may run the inputs through gradient-boosted decision trees to generate next-game projections for each player.

At step 214, organization computing system 104 may generate DRIP values for the player based on the next game projections. For example, prediction module 126 may take each statistical output (e.g., generated at step 212) and may project player contribution to a team's plus/minus per 100 possessions on both offense and defense. In some embodiments, adjusted plus/minus may be used as the target. The final output may be representative of a player's DRIP value. In some embodiments, prediction module 126 may generate three output values: a DRIP value for offense, a DRIP value for defense, and a total DRIP value.

Figure 3A:
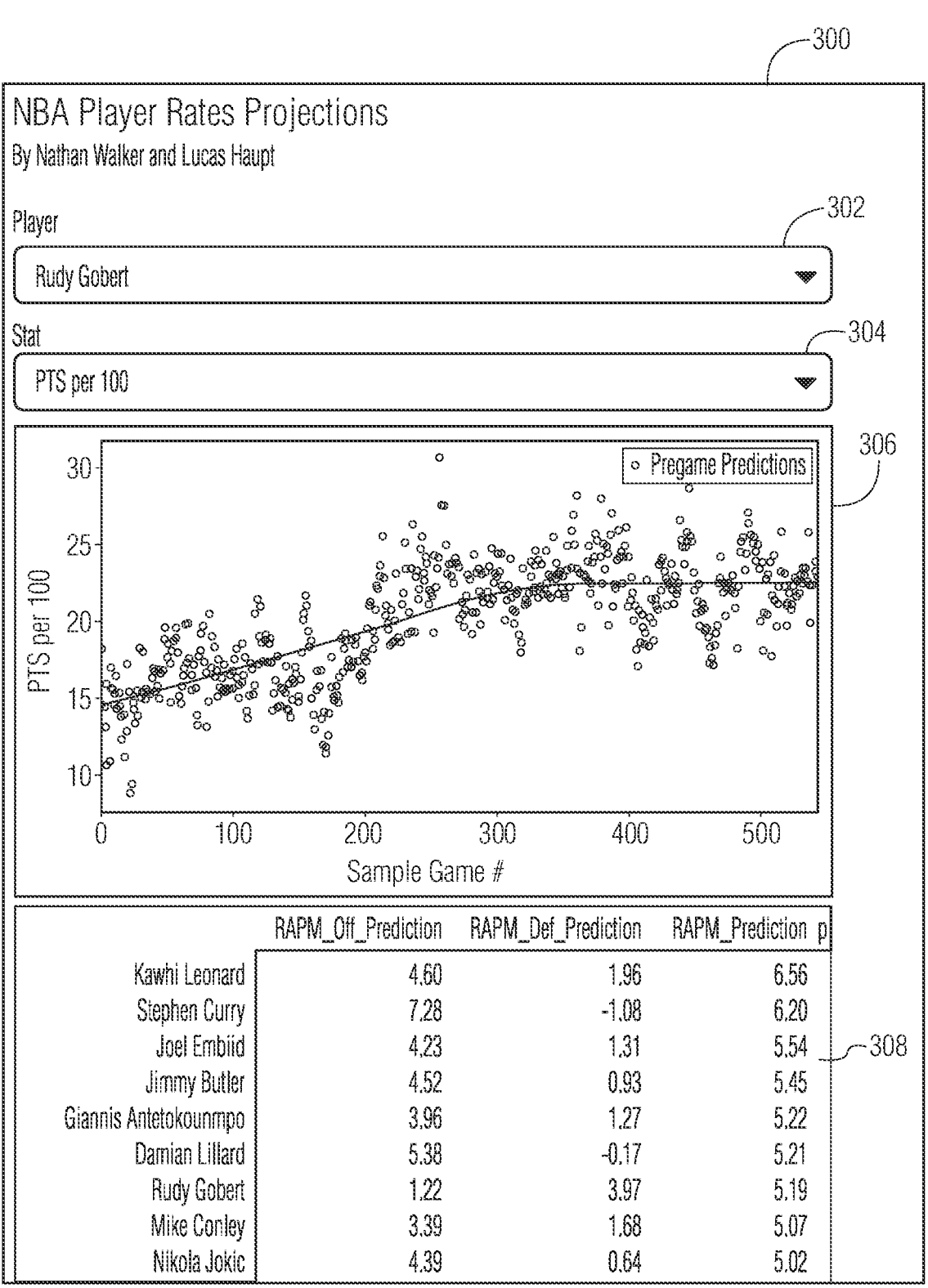
FIG. 3A is an exemplary graphical user interface that includes exemplary player projections, according to example embodiments.

FIG. 3A illustrates a graphical user interface (GUI) 300 that includes exemplary player projections, according to example embodiments. As shown, GUI 300 may include a player dropdown menu 302 and a stat dropdown menu 304. Player dropdown menu 302 may allow a user to select a player; stat dropdown menu 304 may allow the user to select the type of statistic for that player. In GUI 300, the user has selected Rudy Gobert as the player and points per 100 as the statistic. GUI 300 may further include a chart 306 illustrating the selected statistic. In some embodiments, GUI 300 may further include a table 308 listing the statistics of other players in the league.

Figure 3B:
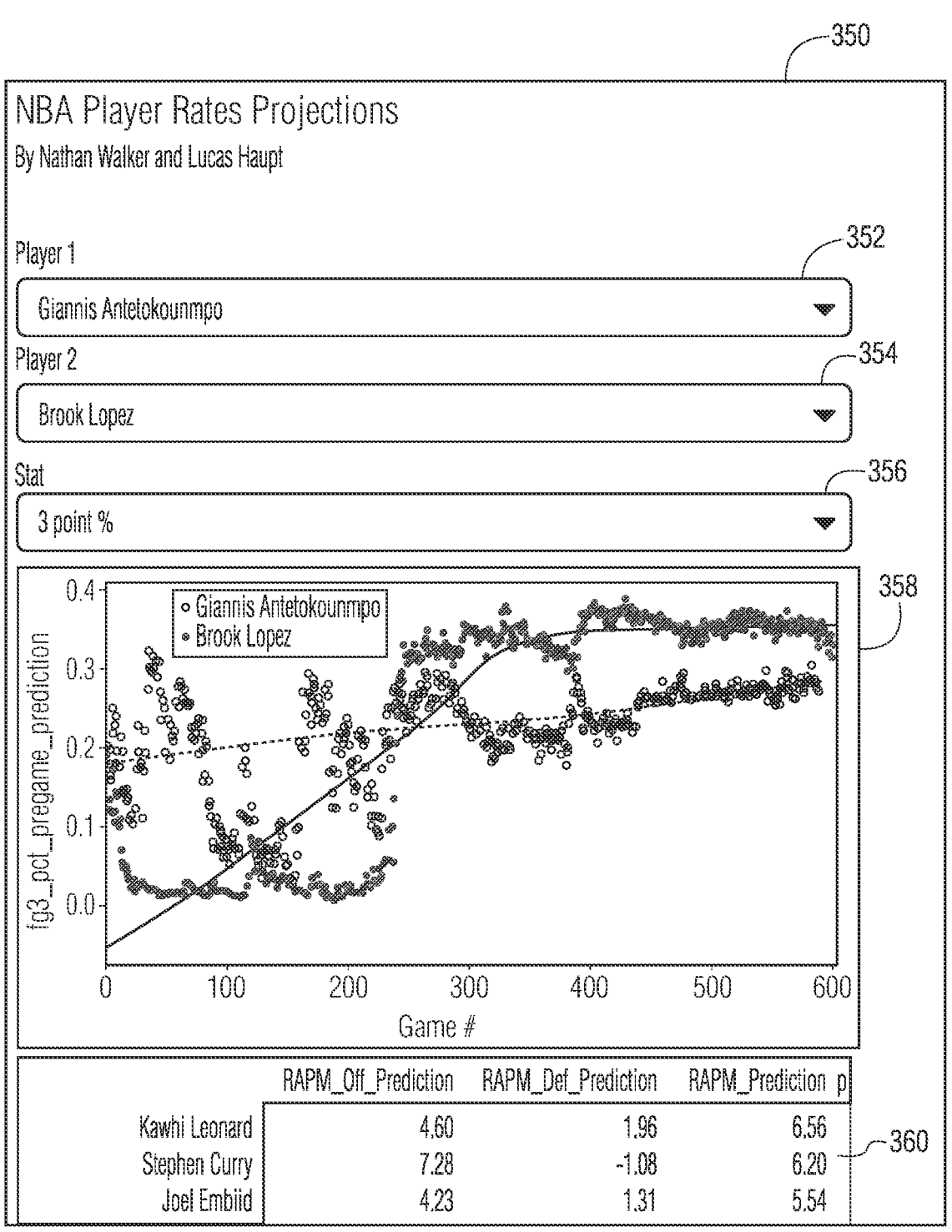
FIG. 3B is an exemplary graphical user interface that includes exemplary player projections, according to example embodiments.

FIG. 3B illustrates a graphical user interface (GUI) 350 that includes exemplary player projections, according to example embodiments. As shown, GUI 350 may include a first player dropdown menu 352, a second player dropdown menu 354, and a stat dropdown menu 356. First player dropdown menu 352 may allow a user to select a first player; second player dropdown menu 354 may allow the user to select a second player; and stat dropdown menu 356 may allow the user to select the type of statistic for that player. In GUI 350, the user has selected Giannis Antetokounmpo as the first layer; Brook Lopez as the second player; and three-point percentage as the statistic. GUI 350 may further include a chart 358 illustrating the selected statistic. Via chart 358, a user may be able to compare the production of Antetokounmpo to Lopez. In some embodiments, GUI 350 may further include a table 360 listing the statistics of other players in the league.

Figures 4A, 4B:
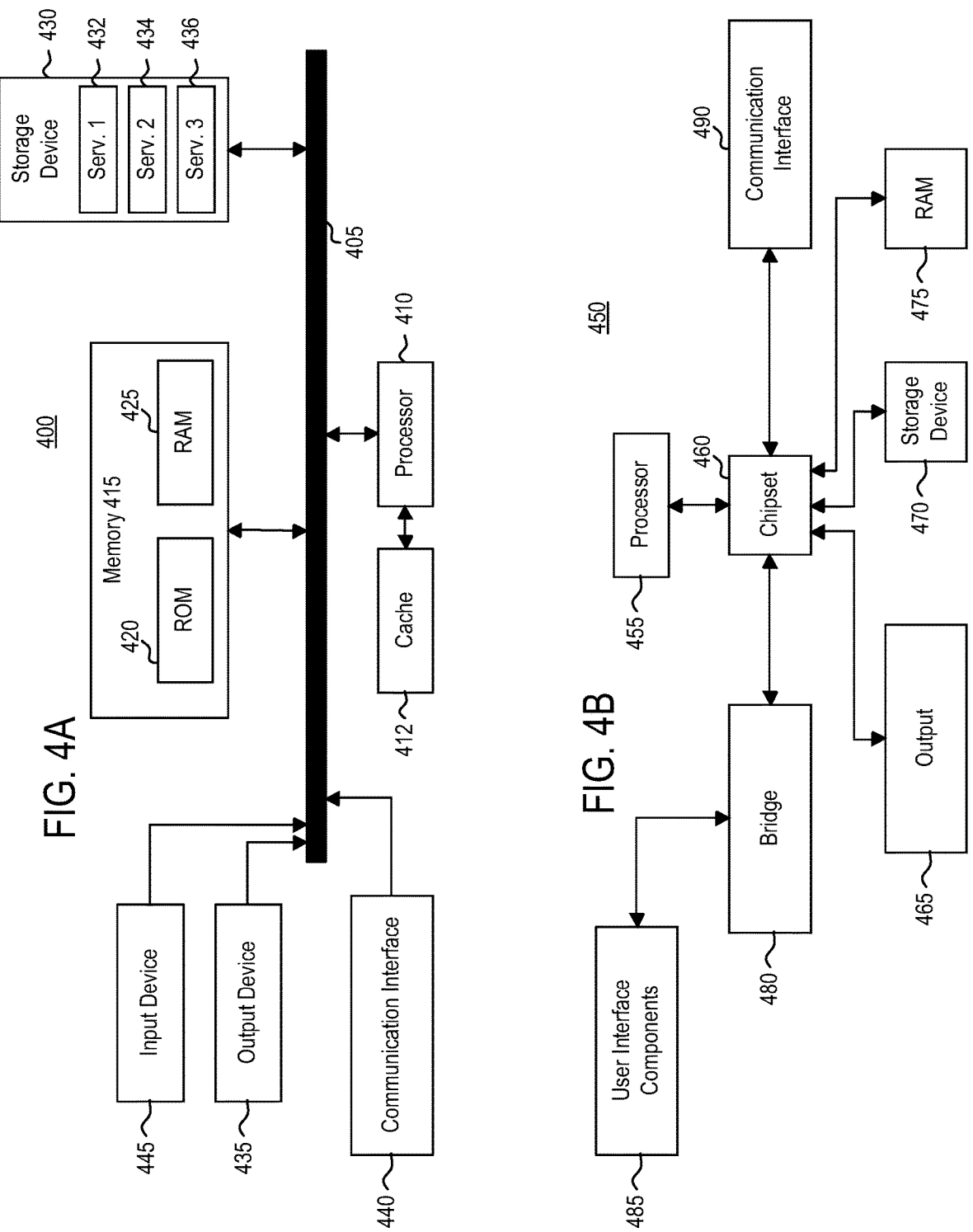
FIG. 4A is a block diagram illustrating a computing device, according to example embodiments.
FIG. 4B is a block diagram illustrating a computing device, according to example embodiments.

FIG. 4A illustrates an architecture of computing system 400, according to example embodiments. System 400 may be representative of at least a portion of organization computing system 104. One or more components of system 400 may be in electrical communication with each other using a bus 405. System 400 may include a processing unit (CPU or processor) 410 and a system bus 405 that couples various system components including the system memory 415, such as read only memory (ROM) 420 and random access memory (RAM) 425, to processor 410. System 400 may include a cache of high-speed memory connected directly with, in close proximity to, or integrated as part of processor 410. System 400 may copy data from memory 415 and/or storage device 430 to cache 412 for quick access by processor 410. In this way, cache 412 may provide a performance boost that avoids processor 410 delays while waiting for data. These and other modules may control or be configured to control processor 410 to perform various actions. Other system memory 415 may be available for use as well. Memory 415 may include multiple different types of memory with different performance characteristics. Processor 410 may include any general purpose processor and a hardware module or software module, such as service 1 432, service 2 434, and service 3 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction with the computing system 400, an input device 445 may represent any number of input mechanisms, such as a microphone for speech, a touch-sensitive screen for gesture or graphical input, keyboard, mouse, motion input, speech and so forth. An output device 435 (e.g., display) may also be one or more of a number of output mechanisms known to those of skill in the art. In some instances, multimodal systems may enable a user to provide multiple types of input to communicate with computing system 400. Communications interface 440 may generally govern and manage the user input and system output. There is no restriction on operating on any particular hardware arrangement and therefore the basic features here may easily be substituted for improved hardware or firmware arrangements as they are developed.

Storage device 430 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 425, read only memory (ROM) 420, and hybrids thereof.

Storage device 430 may include services 432, 434, and 436 for controlling the processor 410. Other hardware or software modules are contemplated. Storage device 430 may be connected to system bus 405. In one aspect, a hardware module that performs a particular function may include the software component stored in a computer-readable medium in connection with the necessary hardware components, such as processor 410, bus 405, output device 435, and so forth, to carry out the function.

FIG. 4B illustrates a computer system 450 having a chipset architecture that may represent at least a portion of organization computing system 104. Computer system 450 may be an example of computer hardware, software, and firmware that may be used to implement the disclosed technology. System 450 may include a processor 455, representative of any number of physically and/or logically distinct resources capable of executing software, firmware, and hardware configured to perform identified computations. Processor 455 may communicate with a chipset 460 that may control input to and output from processor 455. In this example, chipset 460 outputs information to output 465, such as a display, and may read and write information to storage device 470, which may include magnetic media, and solid-state media, for example. Chipset 460 may also read data from and write data to RAM 475. A bridge 480 for interfacing with a variety of user interface components 485 may be provided for interfacing with chipset 460. Such user interface components 485 may include a keyboard, a microphone, touch detection and processing circuitry, a pointing device, such as a mouse, and so on. In general, inputs to system 450 may come from any of a variety of sources, machine generated and/or human generated.

Chipset 460 may also interface with one or more communication interfaces 490 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 455 analyzing data stored in storage device 470 or RAM 475. Further, the machine may receive inputs from a user through user interface components 485 and execute appropriate functions, such as browsing functions by interpreting these inputs using processor 455.

It may be appreciated that example systems 400 and 450 may have more than one processor 410 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A computer-implemented method for refining a player prediction model based on tracking data generated by processing video frames of a broadcast feed, the method comprising:

processing, by a tracking system, the video frames of the broadcast feed to digitally transform video frame data from the video frames into continuous two-dimensional coordinate data;

generating, by the tracking system, tracking data associated with one or more players, wherein the tracking data includes the continuous two-dimensional coordinate data and player motion data and object motion data during one or more events, and wherein the tracking system is in electronic communication with a computing system;

generating, by a pre-processing agent of the computing system, one or more game files formatted to include the video frames associated with included corresponding tracking data;

identifying, by the computing system, a target player of the one or more players, wherein the target player is associated with a plurality of attributes defining a plurality of characteristics of the target player, the plurality of characteristics extracted using tracking data from the one or more game files stored in a data store in electronic communication with the computing system;

generating, by the computing system, rookie priors for the target player using only the plurality of characteristics of the target player;

generating, by the computing system, time series data points for the target player based on the generated rookie priors of the target player;

classifying, by the computing system, a game position of the target player based on the generated rookie priors;

providing, by the computing system, the player prediction model for the target player based on the time series data points and the classifying;

generating, by the player prediction model, one or more next game projections for the target player;

generating, by the computing system, an adjustment weighting, wherein the adjustment weighting is based on a comparison of the one or more next game projections for the target player with an average statistic for the target player; and providing, by the computing system, the adjustment weighting to the player prediction model as training data.

2. The method of claim 1, further comprising:

comparing, by the computing system, the one or more next game projections for the target player to actual statistics of the target player;

determining, by the computing system, that the one or more next game projections for the target player differ from the actual statistics by at least a threshold amount in one category of statistics; and based on the determining, adjusting, by the computing system, the one or more next game projections.

3. The method of claim 1, wherein generating, by the computing system, the rookie priors for the target player using only the plurality of characteristics of the target player comprises:

generating an adjusted game one metric for each statistical category based at least in part on attributes of the target player, the attributes comprising one or more of a height, a weight, an age, and a draft pick number.

4. The method of claim 1, wherein generating, by the computing system, the time series data points for the target player based on the generated rookie priors of the target player comprises:

padding at least one of the rookie priors of the target player with league average data.

5. The method of claim 4, further comprising:

generating a baseline value for each statistic using a bayes filter based on the padded rookie priors.

6. The method of claim 1, wherein classifying, by the computing system, the game position of the target player based on the generated rookie priors of the target player comprises:

generating a position score for the target player, wherein the position score ranges from a true point guard to a true center.

7. The method of claim 1, wherein one or more of the rookie priors, the time series data points, the game position, and a box score of the target player is provided to the player prediction model as input.

8. A non-transitory computer readable medium comprising one or more sequences of instructions, which, when executed by one or more processors, causes a computing system to perform operations for refining a player prediction model based on tracking data generated by processing video frames of a broadcast feed, the operations comprising:

processing, by a tracking system, the video frames of the broadcast feed to digitally transform video frame data from the video frames into continuous two-dimensional coordinate data;

generating, by the tracking system, tracking data associated with one or more players, wherein the tracking data includes the continuous two-dimensional coordinate data and player motion data and object motion data during one or more events, and wherein the tracking system is in electronic communication with a computing system;

generating, by a pre-processing agent of the computing system, one or more game files formatted to include the video frames associated with included corresponding tracking data:

identifying, by the computing system, a target player of the one or more players, wherein the target player is associated with a plurality of attributes defining a plurality of characteristics of the target player, the plurality of characteristics extracted using tracking data from the one or more game files stored in a data store in electronic communication with the computing system;

generating, by the computing system, rookie priors for the target player using only the plurality of characteristics of the target player;

generating, by the computing system, time series data points for the target player based on the generated rookie priors of the target player;

classifying, by the computing system, a game position of the target player based on the generated rookie priors;

providing, by the computing system, the player prediction model for the target player based on the time series data points and the classifying;

generating, by the player prediction model, one or more next game projections for the target player;

generating, by the computing system, an adjustment weighting, wherein the adjustment weighting is based on a comparison of the one or more next game projections for the target player with an average statistic for the target player; and providing, by the computing system, the adjustment weighting to the player prediction model as training data.

9. The non-transitory computer readable medium of claim 8, the operations further comprising:

comparing, by the computing system, the one or more next game projections for the target player to actual statistics of the target player;

determining, by the computing system, that the one or more next game projections for the target player differ from the actual statistics by at least a threshold amount in one category of statistics; and based on the determining, adjusting, by the computing system, the one or more next game projections.

10. The non-transitory computer readable medium of claim 8, wherein generating, by the computing system, the rookie priors for the target player using only the plurality of characteristics of the target player comprises:

generating an adjusted game one metric for each statistical category based at least in part on attributes of the target player, the attributes comprising one or more of a height, a weight, an age, and a draft pick number.

11. The non-transitory computer readable medium of claim 8, wherein generating, by the computing system, the time series data points for the target player based on the generated rookie priors of the target player comprises:

padding at least one of the rookie priors of the target player with league average data.

12. The non-transitory computer readable medium of claim 11, the operations further comprising:

generating a baseline value for each statistic using a bayes filter based on the padded rookie priors.

13. The non-transitory computer readable medium of claim 8, wherein classifying, by the computing system, the game position of the target player based on the generated rookie priors of the target player comprises:

generating a position score for the target player, wherein the position score ranges from a true point guard to a true center.

14. The non-transitory computer readable medium of claim 8, wherein one or more of the rookie priors, the time series data points, the game position, and a box score of the target player is provided to the player prediction model as input.

15. A system, comprising:

a processor; and a memory having programming instructions and a player prediction model stored thereon, which instructions, when executed by the processor, causes the system to perform operations for refining a player prediction model based on tracking data generated by processing video frames of a broadcast feed, the operations comprising:

processing, by a tracking system, the video frames of the broadcast feed to digitally transform video frame data from the video frames into continuous two-dimensional coordinate data;

generating, by the tracking system, tracking data associated with one or more players, wherein the tracking data includes the continuous two-dimensional coordinate data and player motion data and object motion data during one or more events, and wherein the tracking system is in electronic communication with a computing system;

generating, by a pre-processing agent of the system, one or more game files formatted to include the video frames associated with included corresponding tracking data;

identifying, by the processor, a target player of the one or more players, wherein the target player is associated with a plurality of attributes defining a plurality of characteristics of the target player, the plurality of characteristics extracted using tracking data from the one or more game files stored in a data store in electronic communication with the computing system;

generating, by the processor, rookie priors for the target player using only the plurality of characteristics of the target player;

generating, by the processor, time series data points for the target player based on the generated rookie priors of the target player;

classifying, by the processor, a game position of the target player based on the generated rookie priors;

providing, by the processor, the player prediction model for the target player based on the time series data points and the classifying;

generating, by the player prediction model, one or more next game projections for the target player;

generating, by the processor, an adjustment weighting, wherein the adjustment weighting is based on a comparison of the one or more next game projections for the target player with an average statistic for the target player; and providing, by the processor, the adjustment weighting to the player prediction model as training data.

16. The system of claim 15, wherein the operations further comprise:

comparing the one or more next game projections for the target player to actual statistics of the target player;

determining that the one or more next game projections for the target player differ from the actual statistics by at least a threshold amount in one category of statistics; and based on the determining, adjusting the one or more next game projections.

17. The system of claim 15, wherein generating the rookie priors for the target player using only the plurality of characteristics of the target player comprises:

generating an adjusted game one metric for each statistical category based at least in part on attributes of the target player, the attributes comprising one or more of a height, a weight, an age, and a draft pick number.

18. The system of claim 15, wherein generating the time series data points for the target player based on generated rookie priors of the target player comprises:

padding at least one of the rookie priors of the target player with league average data.

19. The system of claim 18, further comprising:

generating a baseline value for each statistic using a bayes filter based on the padded rookie priors.

20. The system of claim 15, wherein one or more of the rookie priors, the time series data points, the game position, and a box score of the target player is provided to the player prediction model as input.

* * * * *